United States Patent
Donahue, III

(10) Patent No.: US 11,341,323 B1
(45) Date of Patent: May 24, 2022

(54) PATENT APPLICATION PREPARATION SYSTEM AND TEMPLATE CREATOR

(71) Applicant: Dennis J M Donahue, III, St. Louis, MO (US)

(72) Inventor: Dennis J M Donahue, III, St. Louis, MO (US)

(*) Notice: Subject to any disclaimer, the term of this patent is extended or adjusted under 35 U.S.C. 154(b) by 189 days.

(21) Appl. No.: 16/211,198

(22) Filed: Dec. 5, 2018

Related U.S. Application Data

(60) Provisional application No. 62/595,581, filed on Dec. 6, 2017.

(51) Int. Cl.
| | | |
|---|---|---|
| *G06F 40/186* | (2020.01) | |
| *G06F 16/2457* | (2019.01) | |
| *G06Q 50/18* | (2012.01) | |
| *G06F 40/205* | (2020.01) | |

(52) U.S. Cl.
CPC ...... *G06F 40/186* (2020.01); *G06F 16/24575* (2019.01); *G06F 40/205* (2020.01); *G06Q 50/184* (2013.01)

(58) Field of Classification Search
CPC ............. G06F 40/186; G06F 40/205; G06F 16/24575; G06F 3/0482; G06Q 50/184
USPC .......................................................... 715/235
See application file for complete search history.

(56) References Cited

U.S. PATENT DOCUMENTS

| | | | |
|---|---|---|---|
| 5,754,939 A * | 5/1998 | Herz ................. | H04N 21/4332 455/3.04 |
| 6,647,383 B1 | 11/2003 | August et al. | |
| 7,133,869 B2 * | 11/2006 | Bryan ................. | H04L 12/1895 |
| 7,225,399 B2 | 5/2007 | Watson | |
| 7,818,320 B2 | 10/2010 | Makeev | |
| 7,890,851 B1 * | 2/2011 | Milton, Jr. ............ | G06F 40/186 715/224 |
| 8,041,739 B2 | 10/2011 | Glasgow | |
| 8,326,861 B1 | 12/2012 | Ainslie et al. | |
| 2002/0059076 A1 | 5/2002 | Grainger et al. | |
| 2002/0087740 A1 * | 7/2002 | Castanho ............. | G06Q 10/107 719/318 |
| 2002/0090934 A1 * | 7/2002 | Mitchelmore ...... | H04L 41/5054 455/412.2 |

(Continued)

OTHER PUBLICATIONS

Microsoft, Alex Blanton, "microsoft computer dictionary, fifth edition" ISBN 0-7356-1495-4 (Year: 2002).*

(Continued)

*Primary Examiner* — Nicholas Augustine
(74) *Attorney, Agent, or Firm* — Creativenture Law, LLC; Dennis J M Donahue, III; Kevin Staed

(57) ABSTRACT

The invention is a patent application preparation system that automatically creates a template application for a drafter based on a record of invention form filled out by the inventor, practitioner or a combination of the two and at least one piece of prior art identified in a search report. The preparation system parses the text within the prior art document and identifies the claim elements that define the scope of the prior art invention. These old inventive features are subsequently highlighted from the claims and written description sections of the prior art references while the general body, format and non-claim features of the prior art remain intact which are subsequently amended and supplemented with the new inventive features described in the record of invention form.

20 Claims, 3 Drawing Sheets

(56) References Cited

U.S. PATENT DOCUMENTS

| | | | |
|---|---|---|---|
| 2003/0131073 A1* | 7/2003 | Lucovsky | H04L 67/303 709/219 |
| 2004/0153465 A1 | 8/2004 | Singleton et al. | |
| 2005/0027741 A1* | 2/2005 | Eichstaedt | G06F 9/542 |
| 2008/0162308 A1* | 7/2008 | Sharma | G06Q 10/087 705/28 |
| 2009/0019386 A1* | 1/2009 | Sweetland | G06F 40/186 715/765 |
| 2012/0095798 A1* | 4/2012 | Mabari | G06F 40/186 705/7.15 |
| 2012/0110440 A1* | 5/2012 | Rosner | G06F 40/10 715/246 |
| 2013/0080883 A1* | 3/2013 | Narasani | G06Q 10/103 715/255 |
| 2013/0145251 A1* | 6/2013 | Jureidini | G06F 16/986 715/234 |
| 2013/0198092 A1 | 8/2013 | Dugan et al. | |
| 2014/0075004 A1* | 3/2014 | Van Dusen | H04L 41/04 709/223 |
| 2016/0048936 A1* | 2/2016 | Perkowski | G06Q 50/184 705/310 |
| 2017/0075877 A1* | 3/2017 | Lepeltier | G06F 40/205 |
| 2019/0057074 A1* | 2/2019 | Carey | G06F 16/93 |

OTHER PUBLICATIONS

Write High-Quality Patents with Precision [online]. LexisNexis, Oct. 27, 2021. Retrieved from the Internet: <URL www.lexisnexisip.com/products/patent-optimizer/>.

LexisNexis PatentOptimizer [online], USPTO, Oct. 27, 2015, Retrieved from the Internet: <URL: https://tsdr.uspto.gov/documentviewer?caseId=sn86800594&docId=SPE20151030073102#docIndex=12>.

LexisNexis PatentOptimizer [online], LexisNexis IP, 2019, Retrieved from the Internet: <URL: https://go.reedtech.com/hubfs/IP-Collateral/PatentOptmizer.pdf?__hstc=126863762.9566ffa62c130d17281b1903287fde7e.1635366241206.1635366241206.1635473413627.2&_hssc=126863762.38.1635473413627&__hsfp=2381867910>.

* cited by examiner

PATENT APPLICATION PREPARATION SYSTEM AND TEMPLATE CREATOR

CROSS-REFERENCE TO RELATED APPLICATIONS

This application claims priority from U.S. Provisional Patent Application No. 62/595,581, filed on Dec. 6, 2017 and which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to automatic document creator systems and methods, and more particularly to automatically created templates for patent applications based on identified prior art references.

Related Art

Document creation systems providing assistance in document drafting are generally known. In particular, document creation systems designed to aid patent attorneys, agents and pro se inventors have been developed to help increase drafting efficiency, standardize application formatting, and ensure that the patent application documents comply with the requirements of the United States Patent and Trademark Office ("USPTO"). Typically, patent applications have been manually drafted by patent practitioners or inventors and include a detailed description of the invention within pre-defined categories as set by the USPTO. For example, patent applications generally include a set of claims that particularly define the parameters of the invention, a specification which more generally describes the invention in view of the claims as well as other unclaimed features, drawings that illustrate various views of the invention and an abstract that briefly describes the invention as a whole. Patent drafting is largely a manual process which varies between each application wherein the drafters understanding of the invention and personal writing style inherently influence how the application is drafted. As can be expected with most manual processes, the drafting of a patent application not only takes a considerable amount of time to complete but also requires a significant level of training and experience before a practitioner or inventor is proficient at drafting an application. Accordingly, there is a desire in the industry to provide a system that aids the drafter of a patent application in the drafting process by reducing the overall time it takes to complete an application as well as to reduce the amount of training and experience needed before the drafter is capable of drafting an adequate patent application.

Perhaps the biggest factors when drafting a patent application is the evaluation of the prior art and differentiating inventive aspects of a device or method from the prior art in order to justify the patentability of the invention. Accordingly, at the outset of the patent preparation process, most patent practitioners conduct prior art searches targeted at identifying the closest prior art to the invention being described in the application. Once these prior art references are identified, the drafter will generally form the claims of the application in view of the prior art where the goal is to draft the broadest claims possible while avoiding the claimed features in the prior art references. Accordingly, the features in the newly described invention and in the prior art typically overlap with a few distinct differences being the innovative features claimed as the invention in the newly described invention.

Subsequently, because the nature of most inventions builds on existing technology and offers particular improvements to features that have already been recited in claims of other inventions, the general written description within the specifications largely overlaps the description of the inventions already known in the technical art. Accordingly, in many cases, only the new innovative features need to be described in greater detail, and these features can focus on the aspects of the invention being recited in the claims. Based on this overlap, there is an opportunity and a desire to those having skill in the art for development of a system that creates a template patent application based on the closest prior art references which can be edited by the drafter to include the distinctly innovative features claimed in the patent application while retaining the more general background information and secondary features that are not claimed in the patent application in a template.

Known prior art patent application preparation systems largely focus on automated document language standardization and auto drafting based on inputs by the drafter. For example, US Pat App. No. 2013/0198092 describes a patent application preparation system that converts claim language entered by the drafter into various aspects of a patent including the specification and abstract. In operation, this system parses the entered claim language and automatically generates portions of the patent application. This reference is especially useful during the manual drafting and review process where changes to the claims is automatically reflected throughout the body of the specification and drawings. Additionally, this system can present different versions of the application at various stages of the application process in view of prosecution history information, such as a piece of prior art identified by the Examiner. For example, the system is able to generate the claims as presented to the Examiner at the time of filing and a subsequent redlined version after the claims are amended in response to an action or document received from the patent office. Additionally, the system described in the '092 Application associates the changes between the original and amended claims with the particular USPTO action or document. However, this prior art reference only presents the application information in view of its own prosecution history and the automation is solely related to changes to the claims by the drafter. Accordingly, there is still a desire to those having skill in the art to provide a system that presents a template based on the prior art in addition to the innovative features of the new invention.

The patent drafting process traditionally follows manual steps that greatly depend on subjective determinations made by the drafter, and existing application preparation systems focus on ensuring the drafter adheres to the formal requirements of a filed application and use uniform language between the claims and the parts of the application that make up the written description. Accordingly, there remains a desire to those having skill in the art for a preparation system that not only ensures the drafter adheres to the formal requirement but also provides an editable template within the field of technology associated with the inventor's invention.

SUMMARY OF THE INVENTION

The invention is a patent application preparation system and template patent application creator based on a piece of prior art identified in a search report tool. Generally, the patent application preparation system described herein eliminates the necessity for a patent drafter to start from scratch with a new patent application for innovative improvements on widely known inventions. For example, certain working tools have been known and used for hundreds of years, and there may have been hundreds or thousands of patents associated with such tools yet patents on improvements still issue every year. Accordingly, when a new inventor develops an innovative improvement to such a wood working tool, the patent preparation system described herein allows the drafter of the patent for this innovative improvement to reuse the basic portions of a previously published patent or application in combination with the features of the new innovation. Beginning with a description of the current state of technology saves the drafter substantial amount of time and costs associated therewith by eliminating the need for the drafter to draft a new application from scratch where instead the drafter need only focus on the sections of the application relating to the new innovation being claimed.

When the drafter of the patent application selects a particular prior art reference that defines the state of the art which is improved upon by the invention, the application preparation tool of the present invention parses the text within the prior art document and identifies the claim elements that define the scope of the prior art invention. These old inventive features can be highlighted in the claims and written description sections of the prior art references while the general body, format and unclaimed features of the prior art remain unchanged in an editable template form.

Another aspect of the patent preparation system is the record of invention form completed by the inventor of the practitioner prior to completing the patent application. Within the record of invention document the drafter identifies the newly innovative features of their invention. Subsequently, the record of invention form may be manually or automatically combined with the prior art template document to form a complete patent application.

Accordingly, another aspect of the invention is for the drafter to be able to review the template document made up of the base portion of the prior art with the new innovative features of the inventors invention filled. Subsequently, the drafter can manually edit the template document but does not necessarily have to go through the entire drafting process including drafting claim preambles and background sections.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

Figure 1:
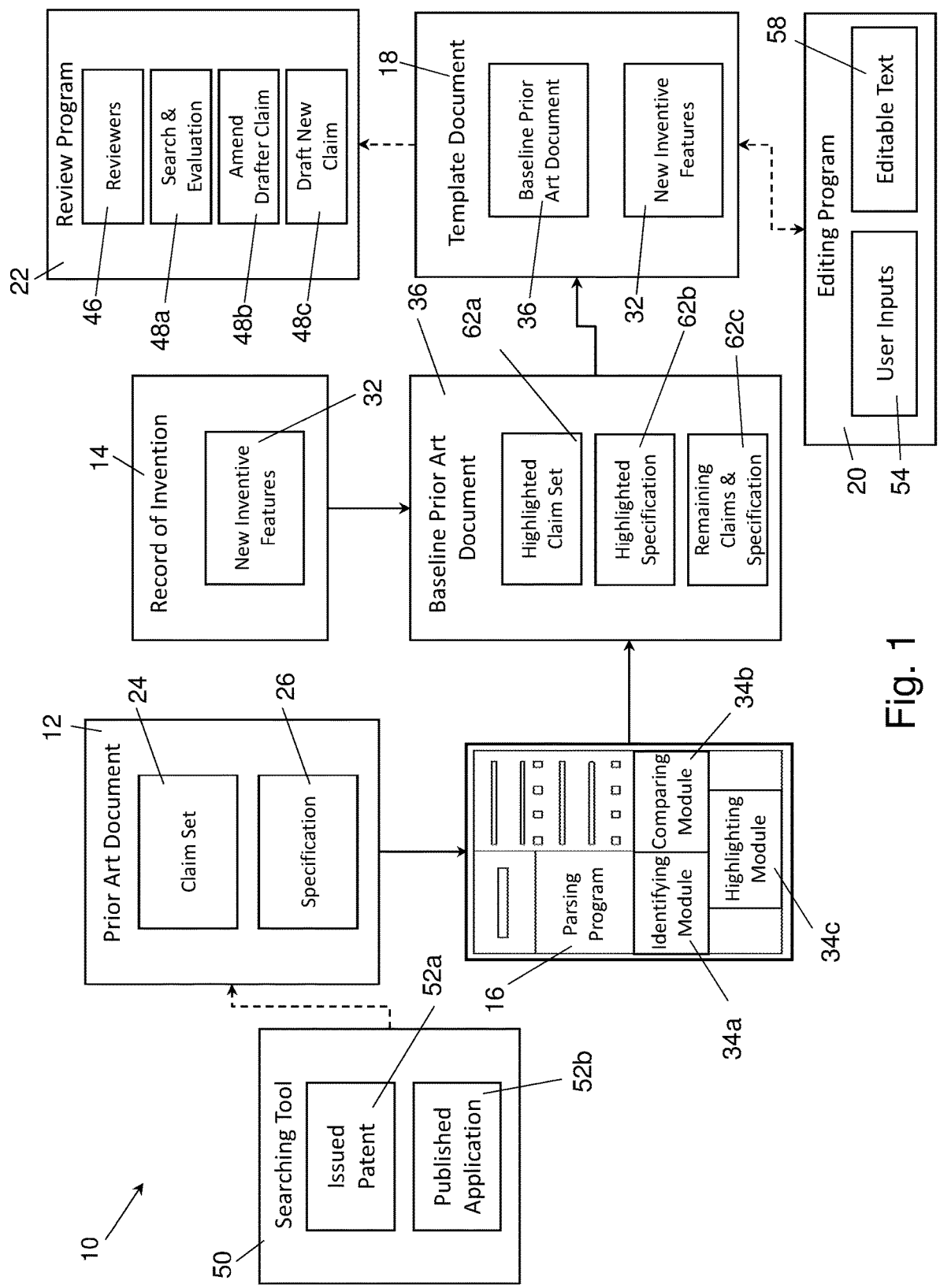
FIG. 1 illustrates a flowchart of the invention described herein in the preferred embodiment.
Figure 2:
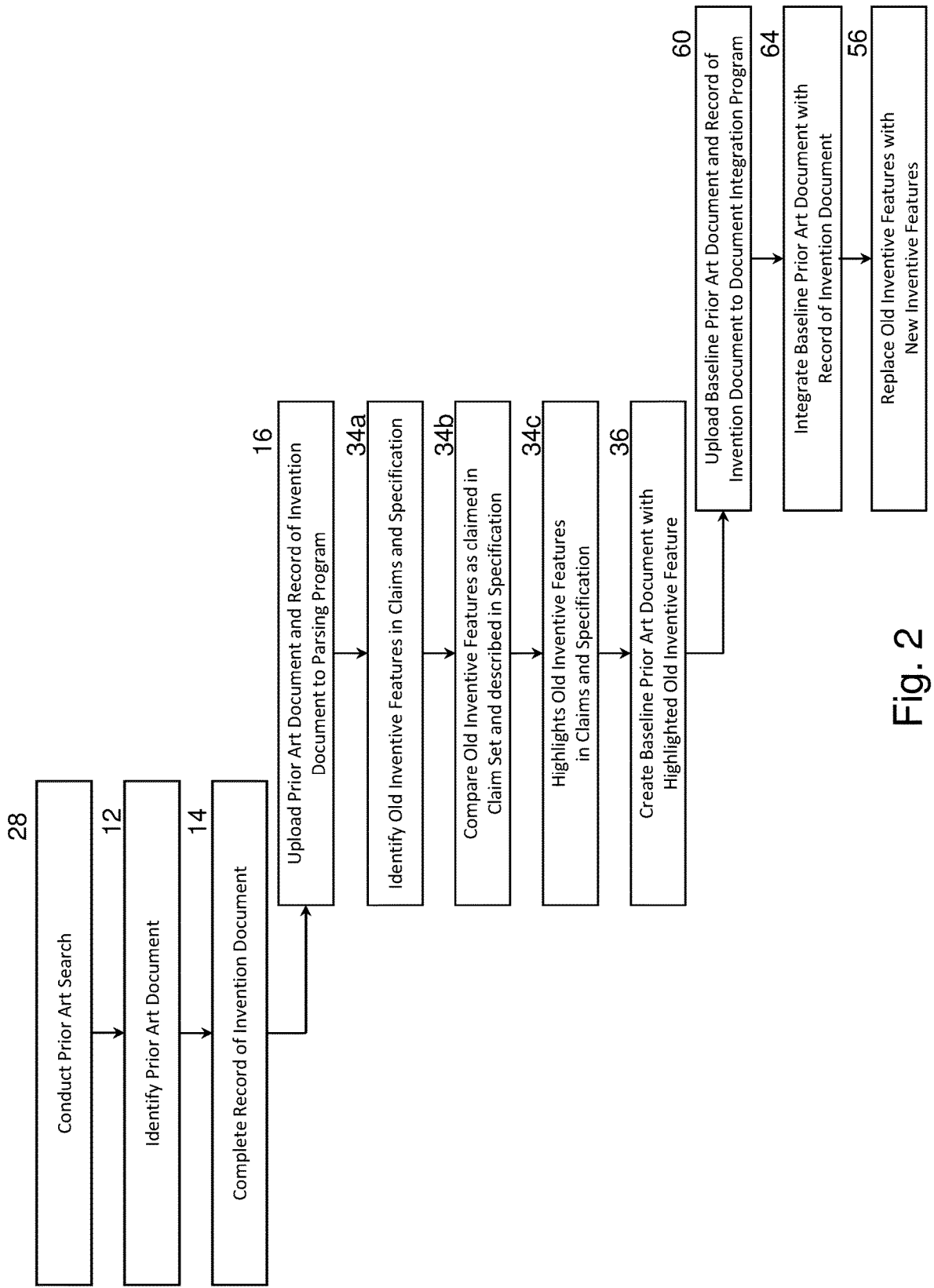
FIG. 2 depicts an operational flowchart of the invention described herein in the preferred embodiment.
Figure 3:
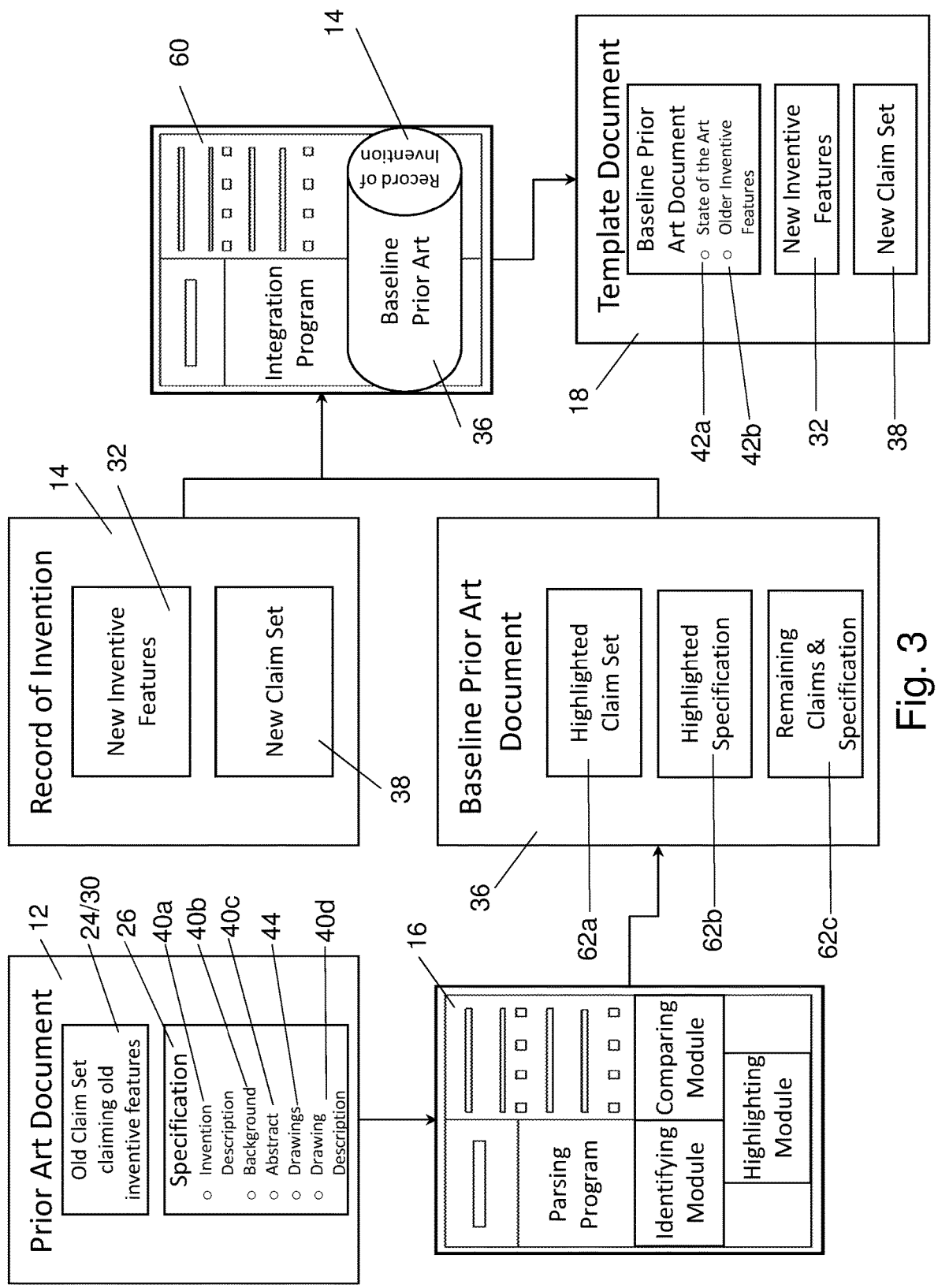
FIG. 3 illustrates a flowchart of the invention described herein in an alternative embodiment.

The following description of the preferred embodiment(s) is merely exemplary in nature and is in no way intended to limit the invention, its application, or uses.

The invention described herein is a patent application preparation system 10 that automatically creates a template application 18 for a drafter based on a record of invention form 14 filled out by the inventor, practitioner or a combination of the two and at least one piece of prior art 12 identified in a search report. The preferred prior art document used to create the template is an issued patent 52a or a published patent application 52b that meets the formal requirements set by the USPTO. However, other prior art references may be used so long as the piece of prior art selected to be made into a template has a claim set 24 and a specification 26.

Generally, the patent application preparation system described herein eliminates the necessity for a patent drafter to start from scratch where instead a template application is automatically created from a prior art reference. The template saves the drafter substantial amounts of time and costs associated therewith by eliminating the need for the drafter to draft a new application from scratch where instead the drafter need only focus on editing the sections of the application relating to the new innovation being claimed through inputs 54 into an editing program 20. Additionally, the drafter may operate even more quickly by automatically uploading the information from the record of invention form into the template without completing any edits, for example when the inventor is up against a critical date and the drafter does not have a substantial amount of time to make multiple edits. Accordingly, an aspect of the patent application system is a prior art document in a field of technology related to the innovative features of the inventor's invention.

Patent practitioners typically conduct or have a search firm perform a search 28 for prior art references that may preempt their inventor's invention. In this preparation system the drafter need only provide a single prior art reference in a text form 58 to be parsed by the parsing program 16 described below. In one embodiment the prior art may be provided by an independent search conducted by the practitioner, search firm or another external searching party. However, the preferred embodiment combines the patent application preparation template creation system with an innovative searching tool 50.

The preferred search report tool allows its users to search for patents and create a report using the details of the patent, automatically populating in an editable report. The search report tool is preferably linked to a Google search engine but may operate with any other search engine that may return patents and patent applications as results. In operation the user enters a search parameter in the search bar and hits a search button. Additionally, the system automatically adds "invention" to the end of the search string before sending the string to the search engine. The system them queries the search engine, preferably Google scholar, with the search string and returns the most relevant results. As the number of returns results may vary, one embodiment of the search tool may return the top twenty (20) results, for example for free users, and another embodiment of the search tool may return the top forty (40) results, for example for paid users. It should be appreciated that the numbers of results returned by the search tool vary and they are not intended to limit the scope of the invention. Once the query is complete the results are displayed in a listing page similar to the Google search results page. Subsequently, the user can click on any results and the details of the search will be displayed in another page similar to how they are displayed in Google scholar for the users review.

Once a user reviews the selected page, an "Add to Report" button will appear that allows the user to save the results from the page into the prior art report. Of course, if the user does not believe the reference is relevant to their invention they may elect to return to the list of results without adding the result to the report. When the user does determine the reference is relevant to their invention and click the "Add to Report" button a report is created and aspects of the selected reference are saved within the report. Although the general view of the report may vary the search report tool particularly saves the following mandatory fields: inventor name, name or person performing the search, e-mail address where the report is to be sent, mobile phone number of person receiving report, invention title and a short description of the invention, preferably extracted from the abstract. Some of these parameters are accordingly pulled directly from the selected reference while others must be entered by the user conducting the search. For example, the invention title and short description of the invention are pulled from the selected reference as shown in the drawings. Conversely, the email address, mobile number and name of searcher must be manually entered by the user conducting the search.

After electing to add a result to the search report the user has the option to categorize the references based on relevancy and add comments for each result. The user may accomplish this by entering free form text of up to 500 words in the "Comments" section. Additionally, a "Relevancy Rating" can be applied from a drop down list in a scale of "Extremely relevant", "Very relevant", "Closely relevant" and "Relevant". Additionally, the user will have the opportunity to add a figure to the search report from a listing of the figures displayed in the Google search result. After these additions are made the user will get a message box stating "Details added to report" that confirms the reference has been successfully added to the search report. If there is an error in adding the details, the user should see "Error in adding details to the report, please try again later".

After the details for the selected reference are added, the user will return back to the search page that has the results from the search query. This process is then repeated until the maximum number of search results have been added to the search report or the user determines the search is complete. As the preset number varies for free and paid users the free user will be given the option to become a paid user in order to save the search report within the search report tool and to conduct additional searches. Preferably, the comments and rating should be encrypted in the system database for each of the searches. Additionally, as indicated above, the patent application preparation creation system and the innovative searching tool are preferably combined, and the entirety of the search reports can optionally be saved by the system for the users to access them later. If they do not wish to pay, the search report will be sent to them via email but it will not be saved within the search report tool for later access. Also, if a free user gets to the maximum of twenty (20) search results in the report, the user will again be given the option to become a paid user to add more records to the search.

During the searching process free and paid users may edit their search report in various ways, including being able to delete the report itself, delete one or more references from the report, change the comments, change the rating as well as being able to save and cancel the report. As mentioned above, free users cannot save the report but have the option to pay and save at any time during the search process. Subsequently the report will be emailed in a pdf format to the free user. The paid users will be given the option of getting the report as a pdf document, a formatted word processing document (rtf), and a spreadsheet document (csv), and will be provided with the option of receiving two (2) or all three (3) of these documents. For free user, once the report is sent the user will get a message "Report has been sent to <email>". Post sending the user's report will not exist in the session. The user can search again and create another report again.

The search report tool also collects user feedback where at the end of their session, the free users will be polled for a user rating, a user experience and a user interest and they will be given a Suggestion & Comment box. The paying users will be given this option at the end of their first search and at the end of each subsequent search will be asked whether they want to take the poll again and whether the search tool has become easier with subsequent uses.

Accordingly, the patent application preparation system may use a result from the described search report tool. Additionally, the search report tool may be incorporated with the patent preparation system where a "Create Template Application Based on this Result" button may be selected by the user and a subsequent template according to the present invention may be created.

Although the search report tool and patent application preparation system described herein preferably return as a search result and use as a template base issued patents and published patent applications, respectively, the prior art reference providing the base for the template need only have a set of claims and a specification. As required by the USPTO and as explained in the background section, the claim set within the reference particularly claims the old inventive features 30 of the invention being described. Conversely, the specification describes not only the particularly claimed aspects recognized by the inventor as their inventive features but may also described more general features, background information, related art, alternative embodiments, preferred uses and other information that relates to the invention but information that may not be particularly expressed in the claims. Additionally, the specification includes multiple subsections including but not limited to an abstract section 40c, a background of the invention section 40a, a detailed description 40b of the invention section, and a description of the drawings 40d section which generally describe more than the particularly claimed elements of the claims. Accordingly, the specification also preferably includes one or more drawings 44 that supplement the text portions of the specification and the claims. The parsing program described below parses the reference and differentiates the old inventive features claimed in the claims and described in the specification from the other general information found in the specification that does not appear in the claims.

Accordingly, another aspect of the patent application preparation system is a parsing program that identifies 34a the inventive features in the claims and specification and compares 34b the identified elements of the claims in the identified prior art reference to the elements in the specification of the identified prior art reference. Once these elements are identified and compared, the parsing program highlights 34c the similar features in both the claims 62a and the specification 62b while leaving the remaining portions 62c of the claims and specification intact. For example, an inventor may claim element X in the claims and subsequently described element X in the specification. However, the inventor may also describe elements A, B and C in the specification without claiming elements A, B and C in the claims. The parsing program therefore recognizes that element X is in both the claims and the specification and suggests that element X is the innovative in the prior art reference. Conversely, elements A, B and C are not the claimed features and therefore are included as background information, support or general information regarding element X. Thus, the parsing program will highlight element X in the specification and claims while retaining elements A, B and C as a template patent application.

It is also possible that the drafter may enter particular features of the invention into the parsing program and the parsing program can highlight these features in the prior art reference. In a semi-automated version of the parsing program, the parsing program could have a table of similar terms in which the drafter can identify aspects of the improvement invention, including standard features and innovative features, and the drafter would also identify corresponding terms used for the features in the prior art reference. In a more automated version of the parsing program, the terms entered by the drafter could be run through a synonym routine to identify other terms that may have been used in the prior art reference.

The parsing program is another aspect of the present invention that produces a baseline prior art document 36 based on the parsed prior art document. The template document acts as a shell for the drafter whereby they do not necessarily have to edit or draft all sections of the shell from scratch but need only supplement the template with new information. With the old inventive features removed from the claims and the specification, the drafter need only insert the inventor's new inventive features 32 into the template document. Of course, the drafter may elect to reword, supplement and/or remove sections from the template document where they see fit. However, it is an aspect of the patent preparation system described herein to provide the drafter with a presentable version of an application without necessarily having to redraft general sections of the specification, which are instead provided by the template document.

In an alternative embodiment, the drafter can select a prior art reference, such as a patent, that is determined to be similar to the invention or that has a good general description of the current state of the art 42a in the area of technology or a description of older inventive features 42b. The parsing program would select a representative claim or set of claims from the prior art reference and provide the claims to the drafter to identify the features that are commonly known and those features that are more directed to the prior art invention. The parsing program can also allow the drafter to identify the new innovative aspects of the invention and may also allow the drafter to link those commonly known features to similar features in the invention. The drafter would be given options for combining the new innovative aspects of the invention with the prior art reference's claims in place of the prior art's unique features.

To help determine the new inventive features, the drafter (inventor or practitioner) preferably completes a record of invention document that particularly describes the innovative features which the inventor regards as their invention. In an embodiment of the patent application preparation system the practitioner may only reference this record of invention where they manually insert claim language and description sections into the template document. However, in another embodiment the record of invention document may be linked to the template document where sections of the completed record of invention are automatically merged within the claim set and/or specification section of the template document and thereby result in a presentable patent application which not only complies with formal filing requirements but also adequately describes the invention in view of the prior art reference identified by the practitioner or inventor as being the closest reference to the inventors invention. Further, the drafter may also include a new claim set 38 claiming the new inventive features in the record of invention document prior to uploading the record of invention and prior art document into the template creation system. Accordingly, the system can update the old claim set with the new claim set 56 when integrating 64 the baseline prior art document with the record of invention document in the integration program 60 and thus provide a more complete template. The document integration program combines the baseline prior art document and the record of invention document, producing the template document. The integration program can replace the old inventive features with the new inventive features in the template document, can add the new inventive features to the old inventive features in the template document, and/or can replace the old claim set with the new claim set in the template document.

In another aspect of the patent application preparation system an innovative review program 22 and process is presented when the patent application created by the preparation system is filed as a provisional patent application ("PPA") with the USPTO. As PPAs are not reviewed by Patent Examiners and merely act as a place holder for the eventual non-provisional utility application that is prosecuted within the USPTO, an inventor and a practitioner do not receive any feedback as to the likelihood that they will be successful during the prosecution of the full utility application. Accordingly, the preparation system described herein provides a review feature that may be incorporated with the paid users subscribing to the search report tool described above or as an additional feature purchased by users who do not use the search report or templates described herein. Alternatively, a finalized template may also be submitted to the review program for review before a PPA is filed.

As part of the innovative system of the present invention, once the template is finalized and the PPA is submitted to the USPTO, the PPA is also submitted to a panel of independent reviewers 46 for a search and evaluation 48a similar to what would be performed during the First Action Interview pilot program for non-provisional patent applications. In the preferred embodiment, the panel of reviewers is made up of retired patent examiners and/or patent attorneys who have expertise in reviewing patents, drafting claims, patent applications and are experienced with the patent prosecution process. Within a period of time of having received the PPA, the application will be assigned to an individual reviewer who will review the application, cited prior art references, claims, drawings and any other information submitted with the PPA. Like a standard review by the USPTO of a utility patent application, the reviewer will conduct a subsequent internal search and provide a search report to the user who submitted the PPA prior to the filing deadline for the non-provisional patent application. The reviewer may include an evaluation similar to a standard office action although the Pre-Interview Communication under the First Action Interview pilot program is more preferable. In addition to the search report and any other communication, the reviewer identifies subject matter in the claims that appear to be patentable and whenever possible, the reviewer provides at least one claim that the reviewer believes could be patentable. The potentially patentable claim may be a form of a claim prepared by the drafter and amended by the reviewer 48*b* or it could be a new claim drafted by the reviewer 48*c*.

In operation, this example claim is preferably presented as part of the office action. In the preferred embodiment the reviewer will provide a new claim that they have drafted which in their experience would support a high likelihood of patentability. However, other embodiments may have the reviewer merely amend the user's claim(s) that are submitted to them in such a way that the amended claim(s) would be patentable in view of the prior art identified by the user and the reviewer. Accordingly, this reviewing system gives the user a first glance at what type of rejections may come from the USPTO and a first opportunity to amend the claims into a form that may be more likely to be deemed patentable by an Examiner during prosecution of the utility patent application.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A patent application template preparation system for describing an invention, comprising:
    a prior art document comprising a claim set and a specification, wherein the claim set claims a plurality of old inventive features, and wherein the specification describes the plurality of old inventive features claimed in the claim set;
    a record of invention document comprising a plurality of new inventive features, wherein a user inputs the plurality of new inventive features into the record of invention document;
    a document parsing program, wherein the document parsing program identifies and compares the plurality of old inventive features in the claim set with the plurality of old inventive features in the specification, wherein the document parsing program highlights the plurality of old inventive features identified and compared in the claim set and the specification, and wherein the document parsing program produces a baseline prior art document; and
    a document integration program, wherein the document integration program automatically combines the baseline prior art document and the record of invention document to produce a template document, and wherein the document integration program at least one of adds the plurality of new inventive features to the plurality of old inventive in the template document and replaces the plurality of old inventive features in the template document with the plurality of new inventive features.

2. The patent application template preparation system of claim 1, wherein the prior art document is at least one of an issued patent and a published patent application, wherein one claim in the claim set is highlighted for replacement, and wherein the document parsing program automatically replaces the plurality of old inventive features in the one claim with the plurality of new inventive features.

3. The patent application template preparation system of claim 1, wherein the record of invention document further comprises a new claim set, wherein the new claim set claims the new inventive features, and wherein the document integration program replaces the old claim set is in the template document with the new claim set to produce a more complete template document.

4. The patent application template preparation system of claim 1 further comprising a template document editing program, wherein a plurality of user inputs in the template document editing program modifies the template document.

5. The patent application template preparation system of claim 1, wherein the document parsing program is further comprised of a synonym routine, wherein a plurality of terms entered into the document parsing program are run through the synonym routine to identify a plurality of corresponding sets of alternative terms for searching a usage of the alternative terms the prior art document, wherein the specification further comprises a background section, a detailed description section, and an abstract section, wherein the background section describes at least one of a present state of the art and an older inventive feature, wherein the detailed description section describes the plurality of old inventive features, and wherein the abstract section summarizes the detailed description section.

6. The patent application template preparation system of claim 1, wherein the prior art document further comprises a plurality of drawings, wherein the specification further comprises a drawing description section, and wherein the drawing description section describes the plurality of drawings.

7. The patent application template preparation system of claim 1, wherein the prior art document, the record of invention document and the template document are in an editable text form.

8. The patent application template preparation system of claim 1 further comprising a search report tool, wherein the search report tool produces the prior art document, wherein the search report tool operates in combination with the document parsing program in a combined system, wherein the search report tool is further comprised of a system database, wherein the record of invention document is linked to the template document in the combined system, and wherein the combined system automatically uploads the record of invention document into the template document.

9. The patent application template preparation system of claim 1 further comprising a review program and a reviewer, wherein the review program provides the template document to the reviewer, and wherein in response to receipt of the template document from the review program the reviewer at least one of drafts a new claim and modifies the old claim set.

10. A method for preparing a patent application template document for describing an invention, comprising the steps of:
    providing a prior art document comprising a claim set and a specification, wherein the claim set claims a plurality of old inventive features, and wherein the specification describes the plurality of old inventive features claimed in the claim set;

inputting a plurality of new inventive features into a record of invention document;

uploading the prior art document to a document parsing program;

identifying the plurality of old inventive features in the claim set and the plurality of old inventive features in the specification with the document parsing program;

comparing the plurality of old inventive features in the claim set and the plurality of old inventive features in the specification with the document parsing program;

highlighting the plurality of old inventive features in the claim set and the plurality of old inventive features in the specification to produce a baseline prior art document;

uploading the baseline prior art document and the record of invention document to a document integration program;

combining the baseline prior art document and the record of invention document into a template document with the document integration program; and replacing the plurality of old inventive features in the template document with the plurality of new inventive features in the record of invention document.

11. The method of claim 10 further comprising the step of inputting a new claim set into the record of invention document, wherein the new claim set claims the new inventive features in the record of invention document.

12. The method of claim 11 further comprising the step of replacing the old claim set in the template document with the new claim set in the record of invention document.

13. The method of claim 10 further comprising the step of modifying the template document with a custom user input.

14. The method of claim 10 further comprising the steps of:

conducting a search for the prior art reference in a searching tool, wherein the search in the searching tool provides a patent reference comprising at least one of an issued patent and a published patent application; and providing an option to select the patent reference to serve as the prior art document.

15. The method of claim 10 further comprising the steps of:

populating a database of patent reviewers with contact information and technologies of expertise for a set of patent application reviewers;

providing the template document to the database;

determining a technology area corresponding with the template document;

selecting a patent reviewer from the database based on the technology area;

presenting the template document to the selected patent reviewer;

receiving a review of the template document application from the patent reviewer, wherein the review of the template document comprises at least one of a new claim and an amended claim produced by the patent reviewer.

16. A patent application template preparation system for describing an invention, comprising:

a prior art document comprising a claim set and a specification, wherein the claim set claims a plurality of old inventive features, and wherein the specification describes the plurality of old inventive features claimed in the claim set;

a record of invention document comprising a plurality of new inventive features and a new claim set, wherein a user inputs the plurality of new inventive features and the new claim set into the record of invention document, and wherein the new claim set claims the new inventive features;

a document parsing program, wherein the document parsing program identifies and compares the plurality of old inventive features in the claim set with the plurality of old inventive features in the specification, wherein the document parsing program highlights the plurality of old inventive features identified and compared in the claim set and the specification, and wherein the document parsing program produces a baseline prior art document;

a document integration program, wherein the document integration program combines the baseline prior art document and the record of invention document, wherein the document integration program produces a template document, wherein the integration program at least one of replaces the plurality of old inventive features with the plurality of new inventive features in the template document, adds the plurality of new inventive features to the plurality of old inventive features in the template document, and replaces the old claim set with the new claim set in the template document; and a template document modification program, wherein a plurality of user inputs in the template document modification program modifies the template document.

17. The patent application template preparation system of claim 16 further comprising a search report tool, wherein the search report tool produces the prior art document.

18. The patent application template preparation system of claim 16, wherein the document parsing program is further comprised of a synonym routine, wherein a plurality of terms entered into the document parsing program are run through the synonym routine to identify a plurality of corresponding sets of synonymous terms that could alternatively be used in the prior art document, wherein the document integration program automatically combines the baseline prior art document and the record of invention document into the template document according to a user selection, and wherein the prior art document, the record of invention document and the template document are in an editable text form.

19. The patent application template preparation system of claim 16, wherein the prior art document further comprises a plurality of drawings, wherein the specification further comprises a background section, a detailed description section, an abstract section, and a drawing description section, wherein the background section describes at least one of a present state of the art and an older inventive feature, wherein the detailed description section describes the plurality of old inventive features, wherein the abstract section summarizes the detailed description section, and wherein the drawing description section describes the plurality of drawings.

20. The patent application template preparation system of claim 16 further comprising a review program and a reviewer, wherein the review program provides the template document to the reviewer, and wherein in response to receipt of the template document from the review program the reviewer at least one of drafts a new claim, modifies the old claim set and modifies the new claim set.

* * * * *